US012574902B2

(12) United States Patent
Kumar et al.

(10) Patent No.: US 12,574,902 B2
(45) Date of Patent: Mar. 10, 2026

(54) METHOD AND DEVICE FOR MOBILE HOT SPOT AUTO BAND SELECTION

(71) Applicant: SAMSUNG ELECTRONICS CO., LTD., Suwon-si (KR)

(72) Inventors: Saranappa Raj Kumar, Bangalore (IN); Radhika Mundra, Bangalore (IN); Mayank Kumar Sahu, Bangalore (IN); Kavin Kumar Thangadorai, Bangalore (IN); Ravikumar Kalaimani, Bangalore (IN); Srihari Sriram, Bangalore (IN); Farooq Hussain Sahebzad, Bangalore (IN); Seshu Babu Maddineni, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 368 days.

(21) Appl. No.: 18/324,738

(22) Filed: May 26, 2023

(65) Prior Publication Data

US 2023/0388973 A1     Nov. 30, 2023

Related U.S. Application Data

(63) Continuation of application No. PCT/KR2023/007000, filed on May 23, 2023.

(30) Foreign Application Priority Data

May 24, 2022     (IN) ............................. 202241029842
Apr. 21, 2023     (IN) ............................. 202241029842

(51) Int. Cl.
  *H04W 72/02*     (2009.01)
  *H04B 17/318*     (2015.01)
  *H04W 4/021*     (2018.01)

(52) U.S. Cl.
  CPC .......... *H04W 72/02* (2013.01); *H04B 17/318* (2015.01); *H04W 4/021* (2013.01)

(58) Field of Classification Search
  CPC ..... H04W 72/02; H04W 4/021; H04W 48/18; H04W 76/15; H04W 76/27; H04W 84/12;
  (Continued)

(56) References Cited

U.S. PATENT DOCUMENTS 9,526,076 B1     12/2016  Park
9,565,685 B2     2/2017  Homchaudhuri et al.
  (Continued)

FOREIGN PATENT DOCUMENTS

CN     103619054 A     3/2014
CN     104822168 B     2/2019
  (Continued)

OTHER PUBLICATIONS

International Search Report & Written Opinion for PCT/KR2023/007000 by Korean Intellectual Property Office dated Aug. 23, 2023.
  (Continued)

*Primary Examiner* — Huy C Ho
(74) *Attorney, Agent, or Firm* — Jefferson IP Law, LLP

(57)     ABSTRACT

Embodiments herein disclose methods for selecting a frequency band in (MHS) for a UE. These methods may include determining, by the UE, one or more parameters, wherein the one or more parameters may include at least one of: signal strength parameters, connectivity conditions of the UE in relation to the client device, and a data consumption capability of the UE, then mapping, by the UE, one or more parameters of the UE to at least one of a cell identity (ID), an Access point ID in case of Wi-Fi sharing (AP ID), and a geolocation of the UE, while connecting with the client device, and selecting, by the UE, the frequency band from a plurality of frequency bands based on at least one of the
  (Continued)

mapped cell ID or application ID and the geolocation of the UE.

19 Claims, 13 Drawing Sheets

(58) Field of Classification Search
CPC .... H04W 88/06; H04W 88/10; H04B 17/318; H04L 5/0069
USPC ........................................................ 370/329
See application file for complete search history.

(56) References Cited

U.S. PATENT DOCUMENTS

| | | | |
|---|---|---|---|
| 10,973,028 | B2 | 4/2021 | Husted et al. |
| 2017/0156149 | A1 | 6/2017 | Lin et al. |
| 2018/0102961 | A1 | 4/2018 | Emmanuel et al. |
| 2018/0338336 | A1 | 11/2018 | Seo et al. |
| 2018/0359017 | A1 | 12/2018 | Kwon et al. |
| 2019/0364566 | A1 | 11/2019 | Husted et al. |
| 2021/0076249 | A1 | 3/2021 | Hsu et al. |
| 2021/0144598 | A1* | 5/2021 | Liu ...................... H04W 76/11 |
| 2021/0195592 | A1 | 6/2021 | Husted et al. |

FOREIGN PATENT DOCUMENTS

| | | |
|---|---|---|
| WO | 2017/166609 A1 | 10/2017 |
| WO | 2018-064897 A1 | 4/2018 |

OTHER PUBLICATIONS

European Search Report dated Apr. 17, 2025, issued in European Application No. 23812115.6.

* cited by examiner

300

302 — Start Learning

304 — MHS turned on with default 2.4 GHz band .
Over a given MHS session collect the client capabilities,
client throughput, PER, backhaul network 306 — Estimate the probability score for each band based on
the collected data for the given Cell_ID/AP_ID

Figure 4:
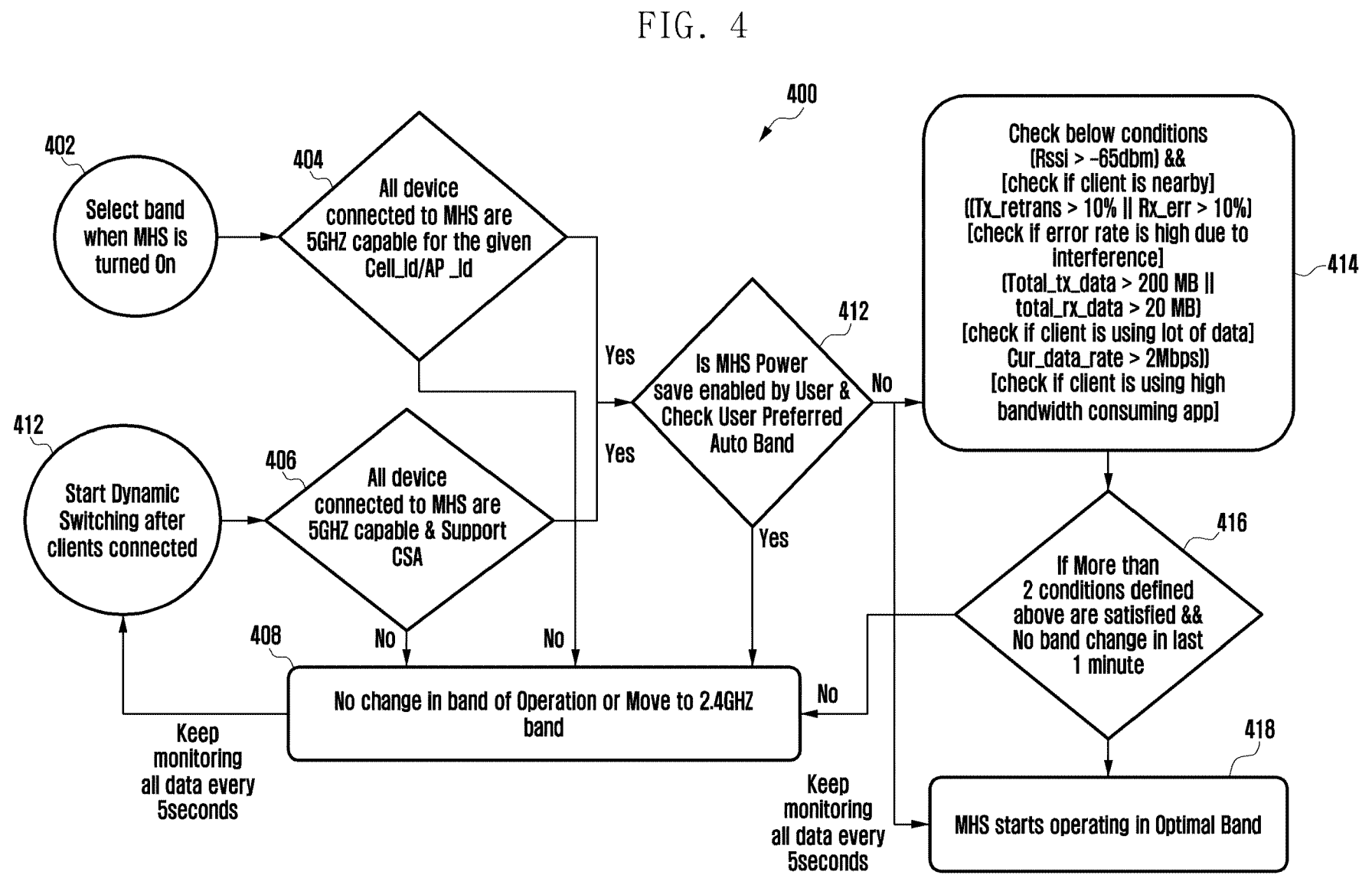

Check below conditions
[Rssi > -65dbm] &&
[check if client is nearby]
([Tx_retrans > 10% || Rx_err > 10%]
[check if error rate is high due to interference]
[Total_tx_data > 200 MB ||
total_rx_data > 20 MB]
[check if client is using lot of data]
Cur_data_rate > 2Mbps])
[check if client is using high bandwidth consuming app]

416

If More than
2 conditions defined
above are satisfied &&
No band change in last
1 minute

418

MHS starts operating in Optimal Band

No

412

Is MHS Power
save enabled by User &
Check User Preferred
Auto Band

Yes

No

Keep monitoring all data every 5seconds

404

All device
connected to MHS are
5GHZ capable for the given
Cell_Id/AP_Id

Yes

Yes

Yes

402

Select band
when MHS is
turned On

406

All device
connected to MHS are
5GHZ capable & Support
CSA

No

No

408

No change in band of Operation or Move to 2.4GHZ band

No

412

Start Dynamic
Switching after
clients connected

Keep monitoring all data every 5seconds

FIG. 5

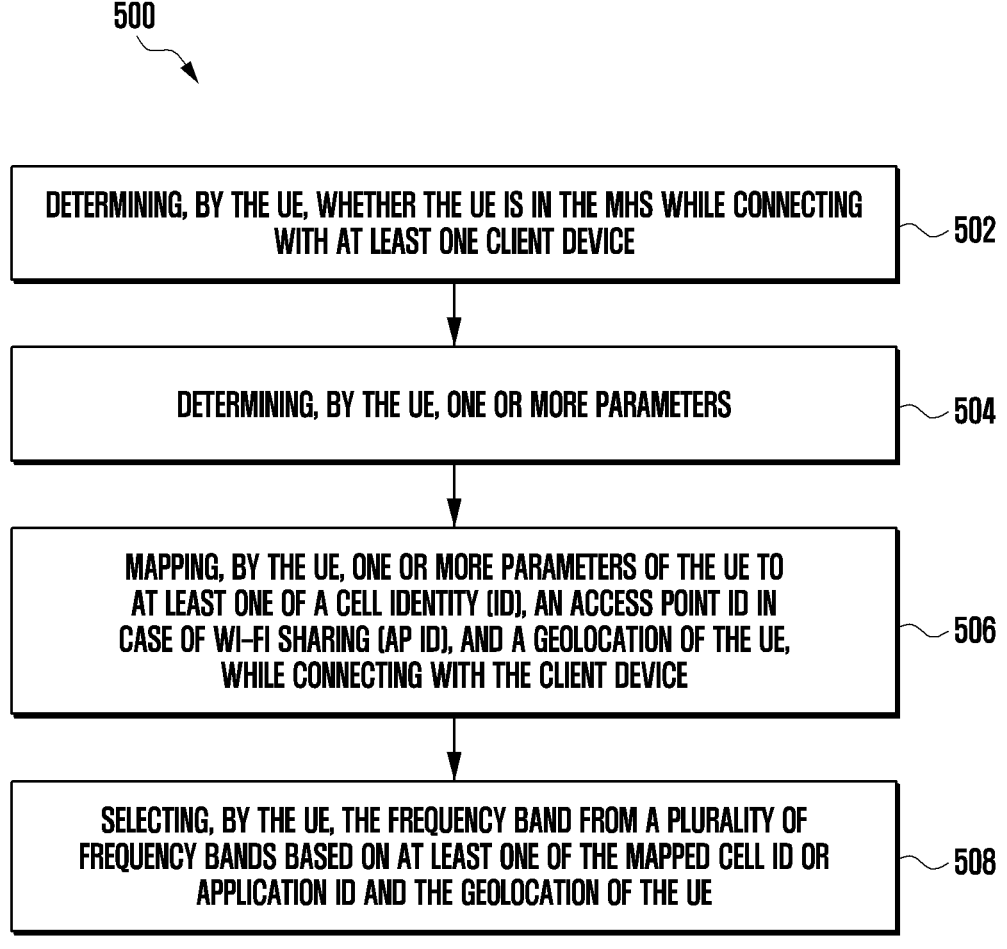

500

DETERMINING, BY THE UE, WHETHER THE UE IS IN THE MHS WHILE CONNECTING WITH AT LEAST ONE CLIENT DEVICE — 502

DETERMINING, BY THE UE, ONE OR MORE PARAMETERS — 504

MAPPING, BY THE UE, ONE OR MORE PARAMETERS OF THE UE TO AT LEAST ONE OF A CELL IDENTITY (ID), AN ACCESS POINT ID IN CASE OF WI-FI SHARING (AP ID), AND A GEOLOCATION OF THE UE, WHILE CONNECTING WITH THE CLIENT DEVICE — 506

SELECTING, BY THE UE, THE FREQUENCY BAND FROM A PLURALITY OF FREQUENCY BANDS BASED ON AT LEAST ONE OF THE MAPPED CELL ID OR APPLICATION ID AND THE GEOLOCATION OF THE UE — 508

FIG. 10

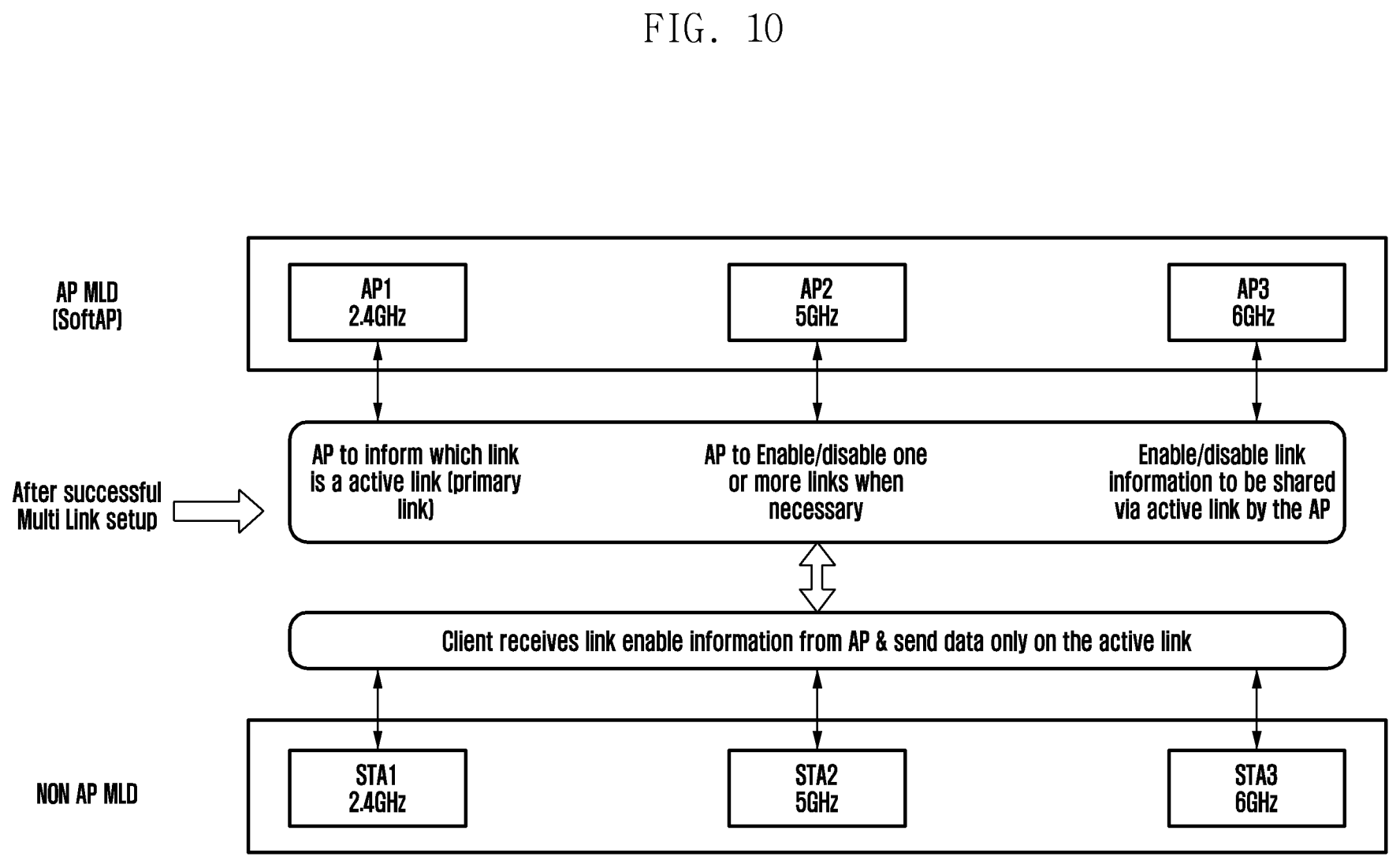

AP MLD
(SoftAP)

AP1
2.4GHz

AP2
5GHz

AP3
6GHz

AP to inform which link is a active link (primary link)

AP to Enable/disable one or more links when necessary

Enable/disable link information to be shared via active link by the AP

After successful Multi Link setup

Client receives link enable information from AP & send data only on the active link STA1
2.4GHz STA2
5GHz STA3
6GHz

NON AP MLD

FIG. 12A

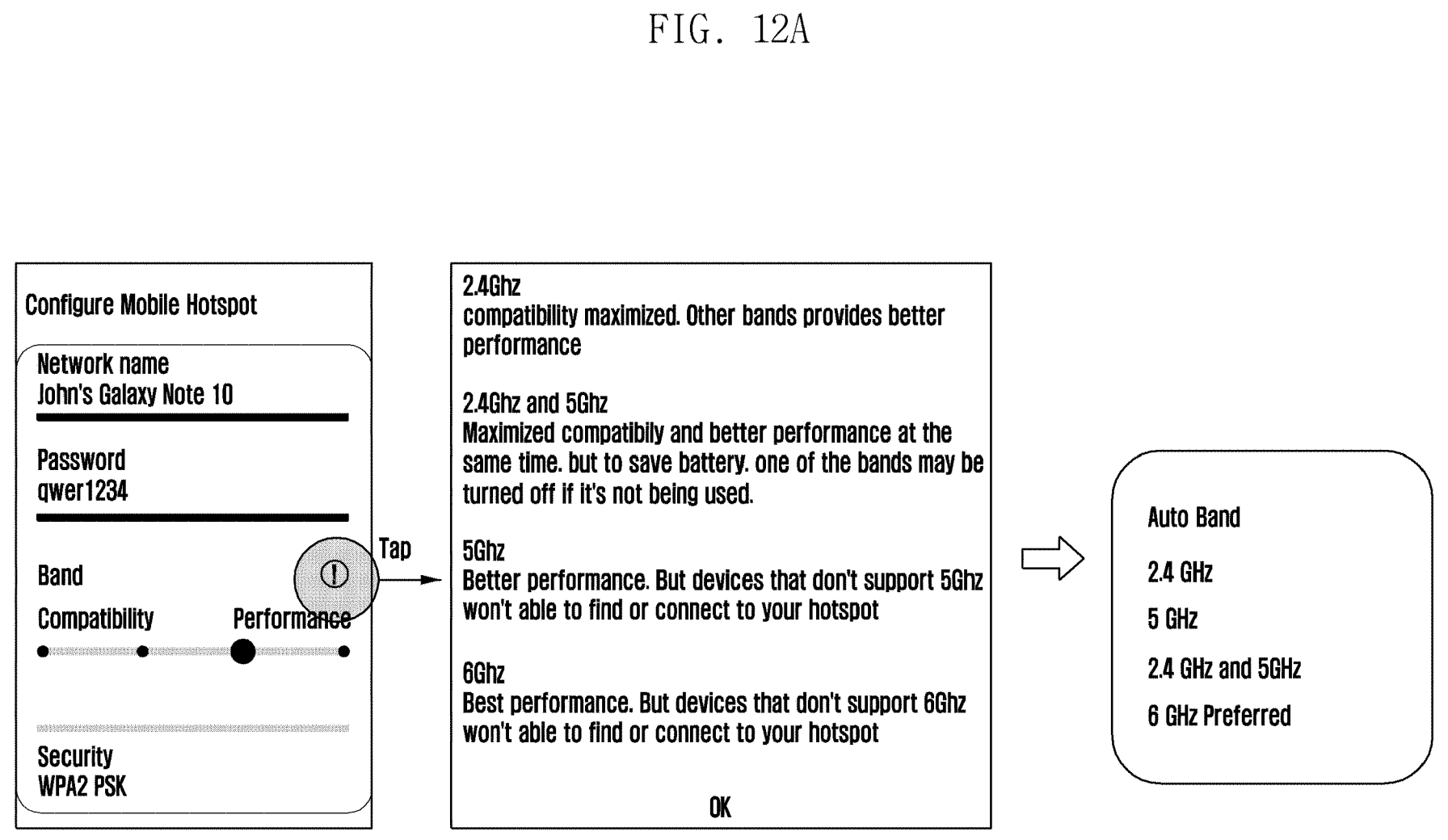

Configure Mobile Hotspot

Network name
John's Galaxy Note 10

Password
qwer1234

Band

Compatibility          Performance

Security
WPA2 PSK

Tap 2.4Ghz
compatibility maximized. Other bands provides better
performance 2.4Ghz and 5Ghz
Maximized compatibily and better performance at the
same time. but to save battery. one of the bands may be
turned off if it's not being used.

5Ghz
Better performance. But devices that don't support 5Ghz
won't able to find or connect to your hotspot 6Ghz
Best performance. But devices that don't support 6Ghz
won't able to find or connect to your hotspot

OK

Auto Band 2.4 GHz

5 GHz 2.4 GHz and 5GHz

6 GHz Preferred

FIG. 12B
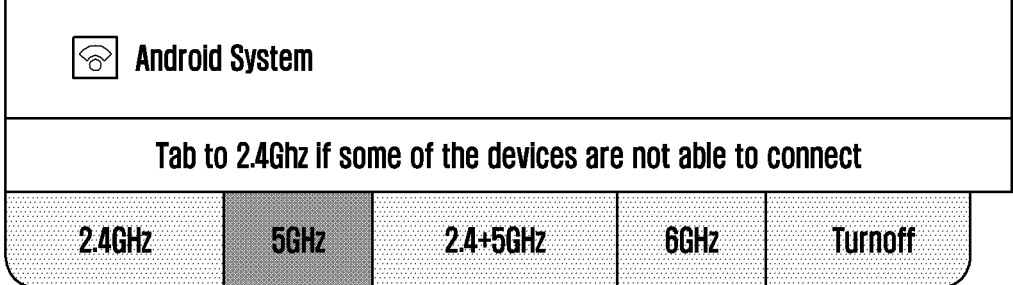

METHOD AND DEVICE FOR MOBILE HOT SPOT AUTO BAND SELECTION

CROSS REFERENCE TO RELATED APPLICATIONS

This application is a continuation application of International Application No. PCT/KR2023/007000, filed on May 23, 2023, which claims priority from and derives the benefit of Indian Patent Application No. 202241029842, filed on May 24, 2022, and Indian Patent Application No. 202241029842, filed on Apr. 21, 2023, the entire contents of which are hereby incorporated in their entirety, by reference.

TECHNICAL FIELD

Embodiments disclosed herein relate generally to wireless communication networks, and more specifically to automatic selection of one or more Wi-Fi operating bands by a user using a user interface.

BACKGROUND

Currently, with the rapid increase in the number of 5G data capable models that support high speed cellular data, the mobile hot spot (MHS) device with default 2.4 GHz channel does not provide sufficient throughput. The user has to select the mobile hot spot (5 GHz Wi-Fi operating band) manually in order to to get high performance. Also, users are mostly unaware of the bands, and it is therefore difficult to select the proper band to ensure high performance.

In an existing mechanism for guiding frequency band switching of a wireless terminal device, the information is communicated to the terminal device so that the device can move to the new band quickly. This is similar to the channel switch announcement, wherein it is determined if the terminal device is dual-band capable (based on probe responses) and guides the dual-frequency wireless terminal device (associated with the first frequency band in the wireless Access Point (AP)) to the second frequency band.

Another existing mechanism deals with using a first hot spot to send connection information to a second hot spot, wherein the information can be used by a terminal device to determine login information of the second hot spot. The terminal device makes a connection to the second hot spot via the first hot spot. The first hot spot receives the second hot spot connection request sent by the terminal device and forwards the request to the second hot spot. The terminal device can switch between one hot spot to another without user input by performing seamless switching between the first hot spot and the second hot spot.

Another existing mechanism deals with changing frequency/band of operation for the AP based on client capability and signal strength. Further, a request is sent to the one or more associated wireless client devices to transition from the first frequency band to the second frequency band.

In another existing technique, a current user interface is provided, so that the band of operation can be modified. The user requires some specific technical knowledge to perform this operation. Accordingly, the user may find it difficult to understand the selection of a band. The user may select mobile hot spot and tethering options (which may display multiple choices for the user with the various bands), and the user may find it difficult to select the particular band for performing a particular operation.

One principal object of the embodiments herein is to disclose methods and a UE to provide a User Interface (UI) for the user, wherein the UI can enable the user to select a Wi-Fi operating band.

Another object of the embodiments herein is to disclose methods and a UE to provide a power saving mechanism for maintaining active connections and switching off idle connection(s) of the band.

Yet another object of the embodiments herein is to disclose methods and a UE to enable idle connection(s) during the band switch.

SUMMARY

Some embodiments herein may provide a method for selecting a frequency band in a Mobile Hot spot (MHS) for a User Equipment (UE). One method, incorporating features of the present disclosure, includes determining, by the UE, whether the UE is in the MHS while connecting with at least one client device; determining, by the UE, one or more parameters, wherein the one or more parameters include at least one of: signal strength parameters, connectivity conditions of the UE in relation to the client device, and a data consumption capability of the UE, then mapping, by the UE, the one or more parameters of the UE to at least one of: a cell identity (ID), an Access point ID (in case of Wi-Fi sharing (AP ID)), and a geolocation of the UE, while connecting with the client device, and selecting, by the UE, a frequency band from a plurality of frequency bands based on at least one of the mapped cell ID or application ID and the geolocation of the UE. The connectivity conditions of the UE may comprise, for example, information on traffic requirements, an upstream connection, Packet Error rates, power requirement, and/or a throughput of the UE in relation with the client device. The method may further comprise adding, by the UE, a Wireless Fidelity (Wi-Fi) band selection option in a user interface of the UE. The method may further comprise shifting, by the UE, the optimum frequency band between one or more frequency bands, if the UE supports a dual-band or a tri-band. The method may further comprise selecting, by the UE, at least one link from a multi-link operation of the MHS. The method may further comprise assigning, by the UE, predefined values to the plurality of the frequency bands. The method may further comprise calculating, by the UE, a probability score of the plurality of the frequency bands being selected by the UE. The method may further comprise maintaining, by the UE, an active connection and turning off an idle connection such that the idle connection is enabled only during band switch.

Some embodiments herein may provide a User Equipment (UE). The UE may comprise a memory, at least one processor, a frequency band controller in communication with the memory, wherein the at least one processor may be configured to: determine whether the UE is in the MHS while connecting with at least one client device, determine one or more parameters, wherein the one or more parameters may comprise at least one of: signal strength parameters, connectivity conditions of the UE in relation to the client device, and a data consumption capability of the UE, then may map the one or more parameters of the UE to at least one of: a cell identity (ID), an Access point ID in case of Wi-Fi sharing (AP ID), and a geolocation of the UE, while connecting with the client device to a cell-identity (ID) or a geolocation of the UE, and select the frequency band from a plurality of frequency bands based on at least one of the mapped cell ID/AP ID; and the mapped geolocation of the UE. The connectivity conditions of the UE may comprise, for example, information on traffic requirements, an upstream connection, Packet Error rates, power requirements, and a throughput of the UE in relation to the client device. The frequency band controller can add a Wireless Fidelity (Wi-Fi) band selection option in a user interface of the UE. In some embodiments, the frequency band controller can shift the optimum frequency band between one or more frequency bands, if the UE supports a dual-band or a tri-band. In some embodiments the frequency band controller can select at least one link from a multi-link operation of the MHS. In some embodiments, the frequency band controller can assign predefined values to the plurality of the frequency bands. In some embodiments, the frequency band controller can calculate a probability score of the plurality of the frequency bands being selected by the UE. In some embodiments, the frequency band controller can maintain an active connection and turn off an idle connection such that the idle connection is enabled only during band switch.

Some embodiments herein may provide a method for selecting a frequency band in a mobile hot spot (MHS) in a User Equipment (UE). Such a method may comprise selecting, by the UE, a band, on a user initiating a connection to the MHS, identifying, by the UE, band capability of at least one connected device to the MHS, identifying, by the UE, user band preferences for the MHS; and automatically selecting, by the UE, a frequency band for the MHS operation based on at least one predefined condition and at least one identified capability and at least one user preference, wherein predefined conditions may include, for example: upstream connection, packet error rates, power consumption, and throughput.

Some embodiments herein may provide a method for selecting a frequency band in a mobile hot spot (MHS) in a User Equipment (UE). The method may comprise detecting, by the UE, that the UE is in an MHS mode operating in a first frequency band and is connected to at least one client device, determining, by the UE, capability of available frequency band capability of the client device, determining, by the UE, one or more signal strength parameters of the UE in relation to the client device, determining, by the UE, connectivity conditions of the UE in relation to the client device, and selecting, by the UE, an optimum frequency band other than the first frequency band based on at least one of: the determined frequency band capability of the client device, the signal strength parameters, and connectivity conditions of the UE in relation to the client device. The preconditions may comprise a signal strength of the one or more MHS available for the UE to select.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

The embodiments disclosed herein are illustrated in the accompanying drawings, throughout which like reference letters indicate corresponding parts in the various figures. The embodiments herein will be better understood from the following description with reference to the drawings, in which:

FIG. 4 illustrates a flow chart for automatically selecting a band based on a static threshold, according to embodiments as disclosed herein;

FIG. 5 illustrates a method for selecting a frequency band in a Mobile Hot spot (MHS) for a User Equipment (UE), according to embodiments as disclosed herein;

FIG. 10 depicts an example process for enabling MHS auto links in Multi Link operations in 802.11be, according to embodiments as disclosed herein;

FIGS. 12A and 12B depict example UIs, for enabling Auto Band option in MHS, according to embodiments as disclosed herein.

DETAILED DESCRIPTION

Figure 1:
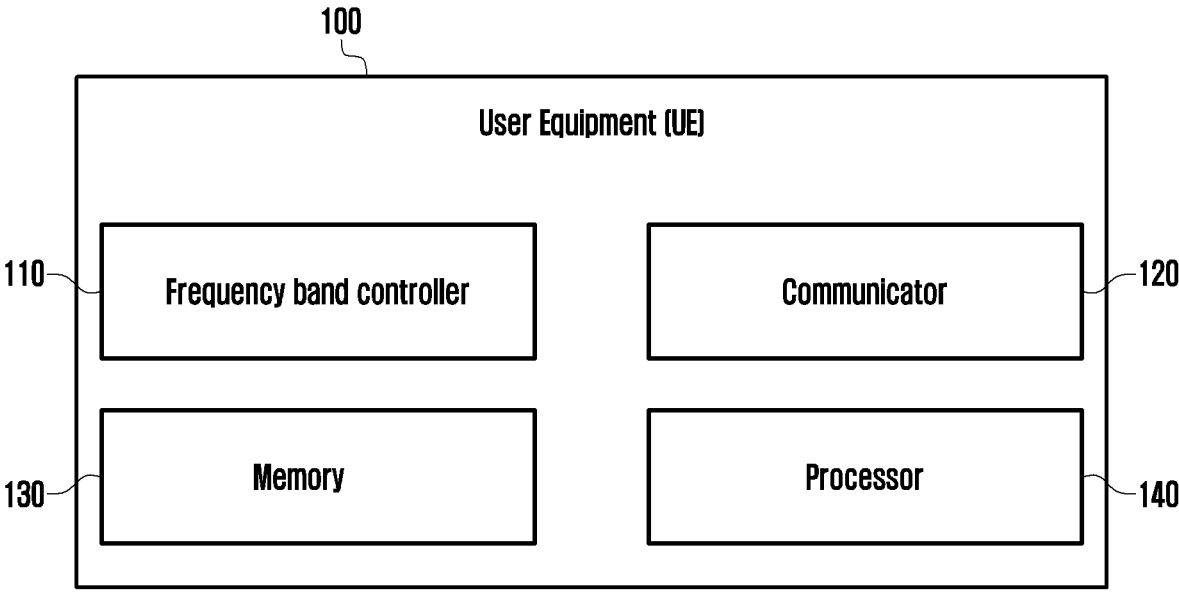
FIG. 1 shows various hardware components of a User Equipment (UE), according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Some embodiments herein may achieve an automatic selection of one or more Wi-Fi operating bands by a user using a user interface. Referring now to the drawings, and more particularly to FIGS. 1 through 12B, where similar reference characters denote corresponding features consistently throughout the figures, there are shown at least one embodiment.

The user may have an option to switch between band(s) based on a performance of a device (i.e., UE). The user can select a particular band for performing the corresponding operation. Thus, embodiments herein can automatically add an option in the UI for the user to select the Wi-Fi band. In an example, consider that the hot spot operates in 2.4 GHz, the user capability details are mapped with cell_id/Geo-location and the 5/6 GHz band channel can be selected to operate the mobile hot spot (based on a plurality of features, such as, a connected client capability, traffic requirements, cell_id etc.).

FIG. 1 shows various hardware components of the UE 100, according to embodiments as disclosed herein. The UE 100 may include a memory 130, at least one processor 140, and a frequency band controller 110. The frequency band controller 110 can be in communication with the memory 130 and the at least one processor 140. The frequency band controller 110 can determine whether the UE 100 is in a Mobile Hot spot (MHS), while connecting with at least one client device. The frequency band controller 110 can further determine one or more parameters, wherein the one or more parameters may comprise at least one of: signal strength parameters, connectivity conditions of the UE 100 in relation to the client device, and a data consumption capability of the UE. The frequency band controller 110 can map one or more parameters of the UE to at least one of a cell identity (ID/cell_id), an Access point ID in case of Wi-Fi sharing (AP ID), and a geolocation of the UE 100, while connecting with the client device to a cell-identity (ID) or a geolocation of the UE 100. The frequency band controller 110 can further select the frequency band from a plurality of frequency bands based on at least one of the mapped cell ID/AP ID; and the mapped geolocation of the UE 100.

The connectivity conditions of the UE 100 may comprise information on traffic requirements, an upstream connection, Packet Error rates, power requirement, and a throughput of the UE 100 in relation with the client device. The frequency band controller 110 can add a Wireless Fidelity (Wi-Fi) band selection option in a User Interface (UI) of the UE 100 (as depicted in the example UI in FIGS. 14A and 14B). The frequency band controller 110 can shift the optimum frequency band between one or more frequency bands, if the UE supports multiple bands. The frequency band controller 110 can select at least one link from a multi-link operation of the MHS. The frequency band controller 110 can assign one or more predefined values to the plurality of the frequency bands. The frequency band controller 110 can calculate a probability score of the plurality of the frequency bands being selected by the UE. The frequency band controller may be further configured to maintain an active connection and turn off an idle connection such that the idle connection is enabled only during band switch.

Further, the UE can check if the client supports obtaining the band and capability (for example, Institute of Electrical and Electronics Engineers (IEEE) 802.11ax capability) details of the client.

Further, the processor 140 may be configured to execute instructions stored in the memory 130 and to perform various processes. The communicator 120 may be configured for communicating internally between internal hardware components and with external devices via one or more networks. The memory 130 may also store instructions to be executed by the processor 140. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 can, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In certain examples, a non-transitory storage medium may store data that can, over time, change (e.g., in Random Access Memory (RAM) or cache).

At least one of the plurality of modules may be implemented through an artificial intelligence (AI) model. A function associated with the AI model may be performed through the non-volatile memory, the volatile memory 130, and the processor 140. The processor 140 may include one or more processors. For example, the one or more processors may be a general-purpose processor, such as a central processing unit (CPU), an application processor (AP) or the like, a graphics-only processing unit such as a graphics processing unit (GPU), a visual processing unit (VPU), and/or an AI-dedicated processor such as a neural processing unit (NPU).

The one or more processors may control the processing of input data in accordance with a predefined operating rule or the AI model stored in the non-volatile memory and the volatile memory. The predefined operating rule or artificial intelligence model can be provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/or may be implemented through a separate server/system.

The AI model may include of a plurality of neural network layers. Each layer may comprise a plurality of weight values, and perform a layer operation through calculation of a previous layer and an operation of a plurality of weights. Examples of neural networks include, but are not limited to, convolutional neural networks (CNN), deep neural networks (DNN), recurrent neural networks (RNN), restricted Boltzmann Machines (RBM), deep belief networks (DBN), bidirectional recurrent deep neural network (BRDNN), generative adversarial networks (GAN), and deep Q-networks.

The learning algorithm is a method for training a predetermined target device (for example, a UE) using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 1 shows various hardware components of the UE 100 but it is to be understood that other embodiments are not limited thereon. In other embodiments, the UE 100 may include less or a greater number of components. Further, the labels or names of the components are used only for illustrative purpose and do not limit the scope of the invention. Furthermore, in some embodiments, one or more components can be combined together to perform same or substantially similar function in the UE 100.

The UE 100 may comprise a power saving mechanism, which can be introduced by maintaining the active connection and turning off the idle connections, wherein the idle connections can be enabled only when performing a band switch. Embodiments herein provide better throughput for the user which uses the capabilities of 4G/5G cellular network.

Figure 2:
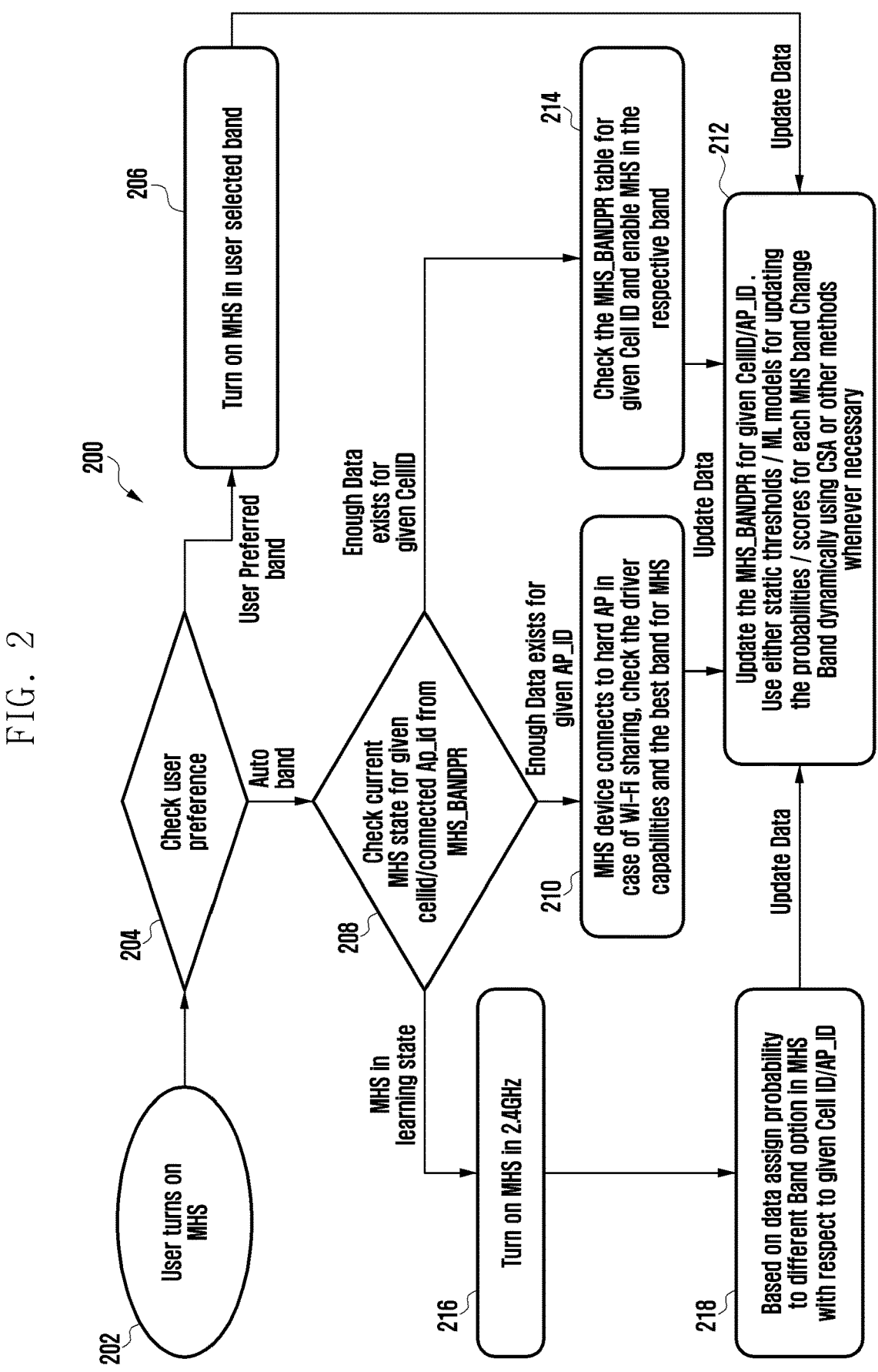
FIG. 2 illustrates a flow chart for selecting a frequency band in a Mobile Hot spot (MHS) for the UE, according to embodiments as disclosed herein.

FIG. 2 illustrates a flow chart for selecting a frequency band in a Mobile Hot spot (MHS) for the UE, according to some embodiments as disclosed herein. At step 202, the user turns on the MHS. At step 204, the UE checks user preference(s) (if any). At step 206, the UE turns on the MHS, wherein the MHS is currently operating in a user selected band. At step 208, the UE checks the current MHS state for given cell_id/connected AP_ID from MHS_BANDPROBABILITY. At step 210, a MHS device connects to the hard AP (in case of Wi-Fi sharing). The MHS device further checks the driver capabilities and the best band for MHS. At step 212, the UE updates the MHS_BANDPR for a given Cell_ID/AP_ID. The UE can further use either static thresholds and/or ML models for updating the probabilities/scores for each MHS band. The UE can accordingly change the band dynamically using CSA or other methods whenever necessary. At step 214, the MHS_BANDPR table is checked for a given Cell ID and MHS is enabled in the respective band. At step 216, MHS is turned on in the 2.4 GHz. At step 218, based on data (such as Cell_ID/AP_ID: client capability, throughput, PER, Backhaul (3G/4G/5G/5 GHz/2.4 GHz/6 GHz), and so on), probabilities (i.e., a probability score) are assigned to different band options in the MHS with respect to a given Cell_ID/AP_ID. The various actions in method 200 may be performed in the order presented, in a different order or simultaneously. Further, in some embodiments, some actions listed in FIG. 2 may be omitted.

Figure 3:
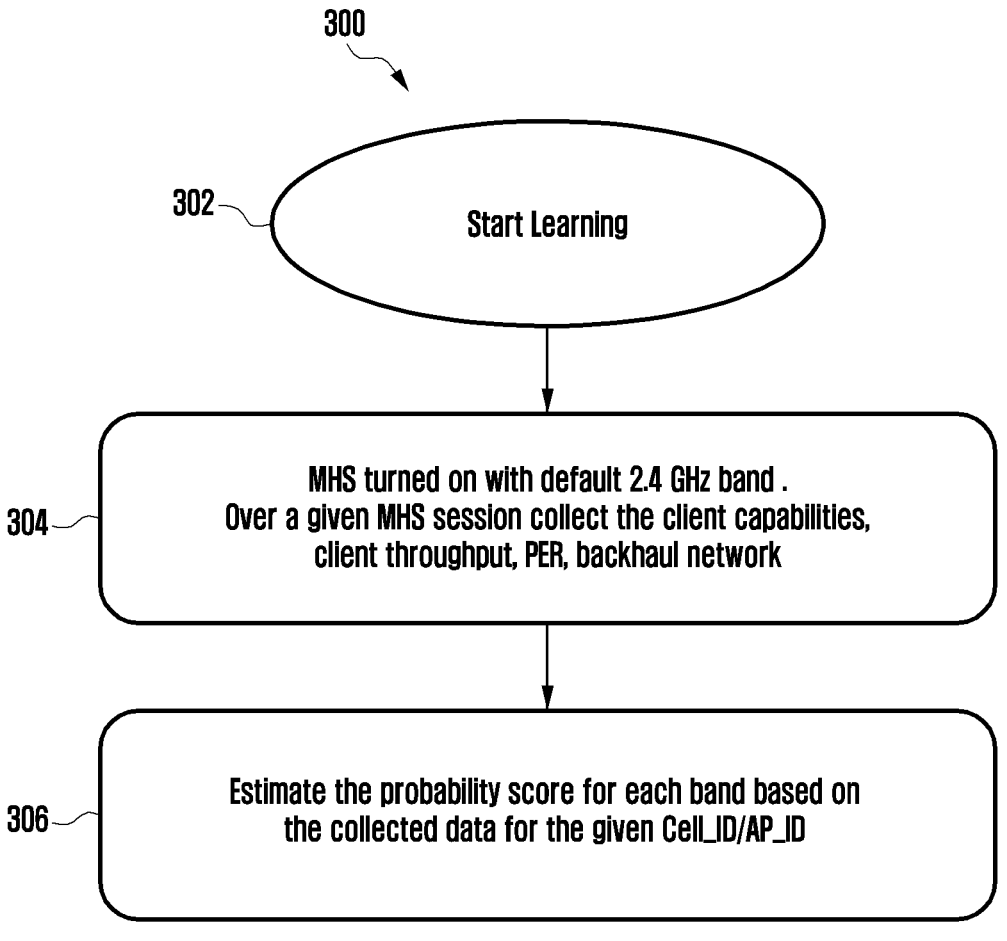
FIG. 3 illustrates a flow chart for automatically selecting a band, according to embodiments as disclosed herein.

FIG. 3 illustrates a flow chart for automatically selecting a band, according to embodiments as disclosed herein. At step 302, the AI starts learning. At step 304, the UE turns on the MHS with a default band (such as a 2.4 GHz band). Over a given MHS session, the UE collects the client capabilities, client throughput, PER, and backhaul network. Table 1 depicts an example of the collected client capabilities.

TABLE 1

| Cell ID/AP_ID | User Preference | Connection State |
|---|---|---|
| 123 | Auto | Probability for each MHS band: Select 5 GHz as throughput requirement is very high |
| 123 | 2.4 GHz | Operate in 2.4 GHz |
| 598(HOME_AP) | Auto | Hard AP on 2.4 GHz, operate MHS on 5 GHz (all clients 5 GHz capable) |
| 123 | Auto | Select 5 GHz as throughput is requirement is very high |
| 546 | Auto | Probability for each MHS band: select 2.4 + 5 GHz bands as few clients are only 2.4 GHz capable and few client need high throughput and PER is high over 2.4 GHz channel |

At step 306, the UE estimates the probability score for each band based on the collected data for the given Cell_ID/AP_ID. The various actions in method 300 may be performed in the order presented, in a different order or simultaneously. Further, in some embodiments, some actions listed in FIG. 3 may be omitted.

FIG. 4 illustrates a flow chart for automatically selecting a band based on a static threshold, according to embodiments as disclosed herein. At step 402, on turning ON the MHS, the UE selects the band. At step 404, a check is made if all devices connected to the MHS are 5 GHz capable for the given Cell_ID/AP_ID. At step 406, a check is made if all devices connected to the MHS are 5 GHz capable and support CSA. In step 412, the UE checks if the user has enabled the MHS Power save & also checks if the user has assigned a preferred auto band. In step 414, the UE 100 further checks the following conditions:

(Rssi>−65 dbm) &&;

Is the client is nearby;

Tx_retrans>10% II Rx_err>10%);

Is the error rate high due to interference;

Total_tx_data>200 MB||total_rx_data>20 MB);

Is the client is using large amounts of data;

Cur_data_rate>2 Mbps; and

Is the client is using a high bandwidth consuming application.

In step 416, the UE checks the following:

if more than 2 conditions defined above are satisfied; and there is no band change in the last 1 minute.

If more than 2 conditions defined above are not satisfied; or there is a band change in the last 1 minute, in step 408, there will be no change in band of operation or the MHS moves to the default band (for example, the 2.4 GHz band). Table 2 depicts example parameters that may be used for selecting the bands based on static thresholds.

TABLE 2

| Client RSSI | Connected client signal strength |
|---|---|
| Packet Error rates (Tx_retransmit, Rx_err) | Tx_retransmit: Denotes % of packets retransmitted by AP for all clients<br>Rx_err: Denotes % of packets received with Error<br>Higher error rate or high retransmit indicate Wi-Fi environment is very congested |
| Data_rate | The rate at which the client is downloading the data updated every 1 second (take average of last 5 seconds) |
| Total_rx_data, Total_tx_data | The complete data consumption over last/current MHS session. Tx_data: data downloaded by client, rx_data: data uploaded by client<br>Higher data download indicates client require very high bandwidth. |
| Power | If power save is enabled by user for MHS use, 2.4 GHz band else free to use other Bands |
| Cell_ID/AP_ID | All the above data is mapped with cell_id if backhaul for MHS is data network and AP_ID if backhaul is Wi-Fi AP in case of Wi-Fi sharing. Cell_ID/AP_ID is used if Band selection is done while user turns on MHS. To switch band dynamically the other parameters will be used |
| Client capability | Information about client supported bands (2.4/5/6 GHZ) |

The various actions in method 400 may be performed in the order presented, in a different order or simultaneously. Further, in some embodiments, some actions listed in FIG. 4 may be omitted.

FIG. 5 illustrates a method for selecting a frequency band in a Mobile Hot spot (MHS) for a User Equipment (UE), according to some embodiments as disclosed herein. At step 502, the method 500 includes determining, by the UE, whether the UE is in the MHS, while connecting with at least one client device. At step 504, the method 500 includes determining, by the UE, one or more parameters, wherein the one or more parameters includes at least one of signal strength parameters, connectivity conditions of the UE in relation to the client device, and a data consumption capability of the UE. At step 506, the method 500 includes mapping, by the UE, one or more parameters of the UE to at least one of a cell identity (Cell_ID), an AP ID (AP_ID) (in case of Wi-Fi sharing), and a current location of the UE, while connecting with the client device. At step 508, the method 500 includes selecting, by the UE, the frequency band from a plurality of frequency bands based on at least one of the mapped cell ID or application ID and the geolocation of the UE. The various actions in method 500 may be performed in the order presented, in a different order or simultaneously. Further, in some embodiments, some actions listed in FIG. 5 may be omitted.

Figure 6:
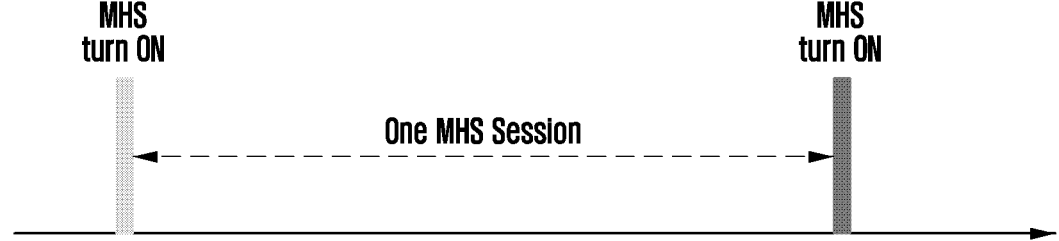
FIG. 6 depicts the MHS session, according to embodiments as disclosed herein.

If a user connects a 2.4 GHz only capable device, then the UE can operate the MHS in 2.4 GHz band for the given Cell_ID/location. If the MHS is operating in the 5 GHz band and if no client device is connected during the MHS session/ no client connected for a given amount of time, the UE can fall back to 2.4 GHz. Along with client capability, embodiments herein can also consider other parameters like upstream connection (4G/5G/Hard AP in case of Wi-Fi sharing), error rates, power consumption, throughput to compute probability/score for each MHS band, and so on. The MHS session refers to the time duration between MHS turn ON to MHS turned OFF (as depicted in FIG. 6). The band of operation can be modified while the clients are already connected to MHS to save power and improve user experience subjected to hardware support for CSA over other band.

Figure 7:
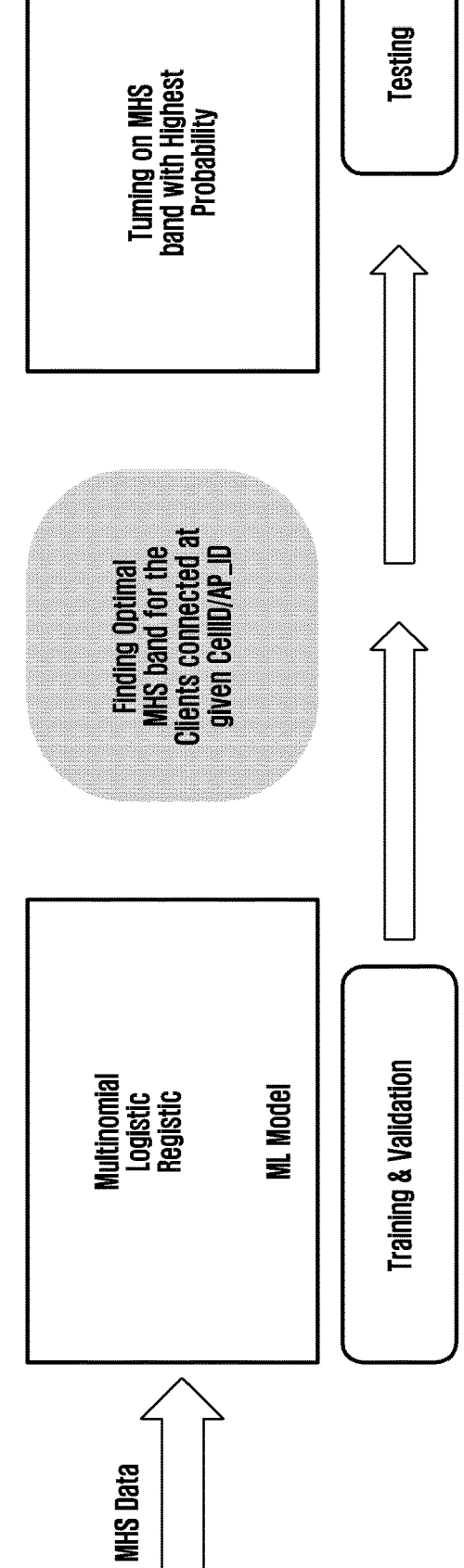
FIG. 7 depicts a process of using a Machine Learning (ML) model based on logistic regression for selecting an operating band for MHS, according to embodiments as disclosed herein.

FIG. 7 depicts a process of using a Machine Learning (ML) model based on logistic regression for selecting an operating band for a MHS. For the purposes of collecting data, consider that the MHS initially operates on the default band (in the current example, 2.4 Gz). Predefined values can be assigned to other bands and a probable score/probability can be calculated for all the bands. Based on the logistic regression values, a band is good for the user can be chosen.

Figure 8:
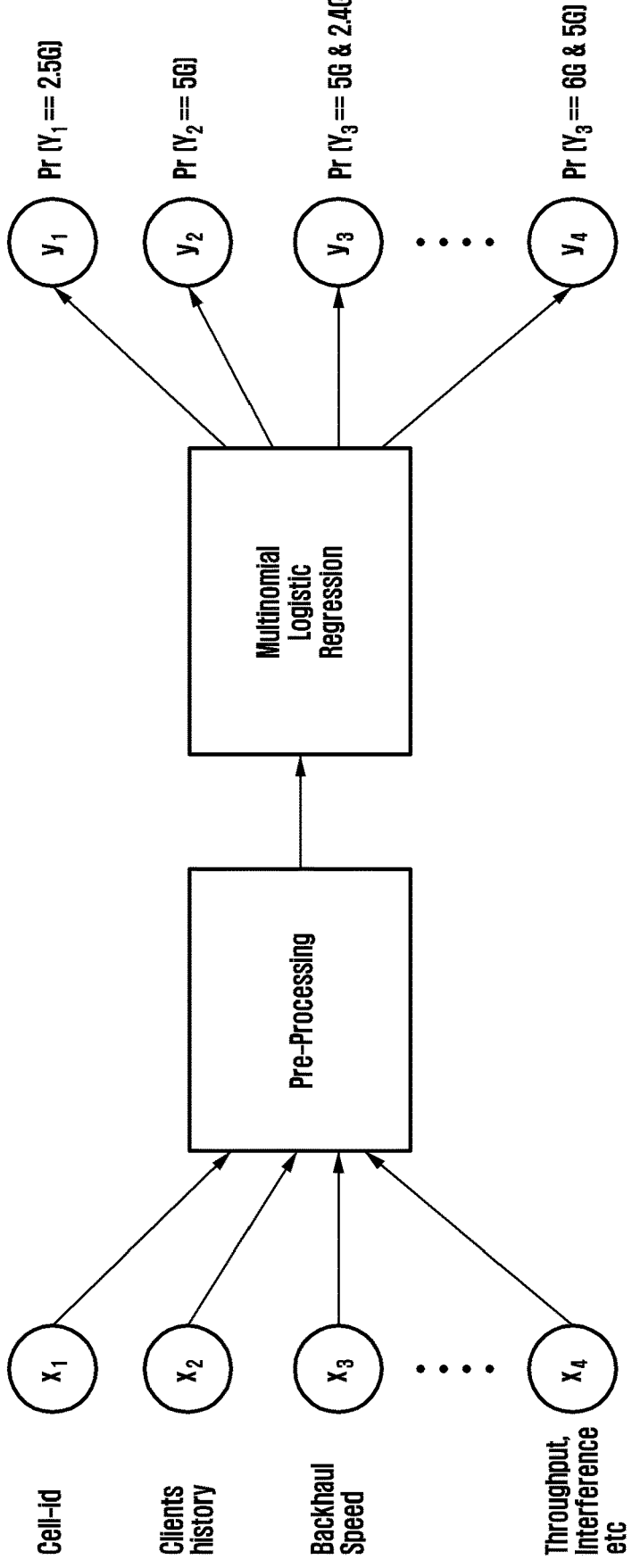
FIG. 8 depicts a multinomial regression module, according to embodiments as disclosed herein.

The MHS data can be used as input to the ML model (for example, a multinomial regression module (as depicted in FIG. 8)). The ML can be further trained and validated. The ML model can be used for determining at least one optimal MHS band for the clients connected at a given Cell_ID/ AP_ID, wherein the optimal MHS band is the band with the highest probability score.

Figure 9:
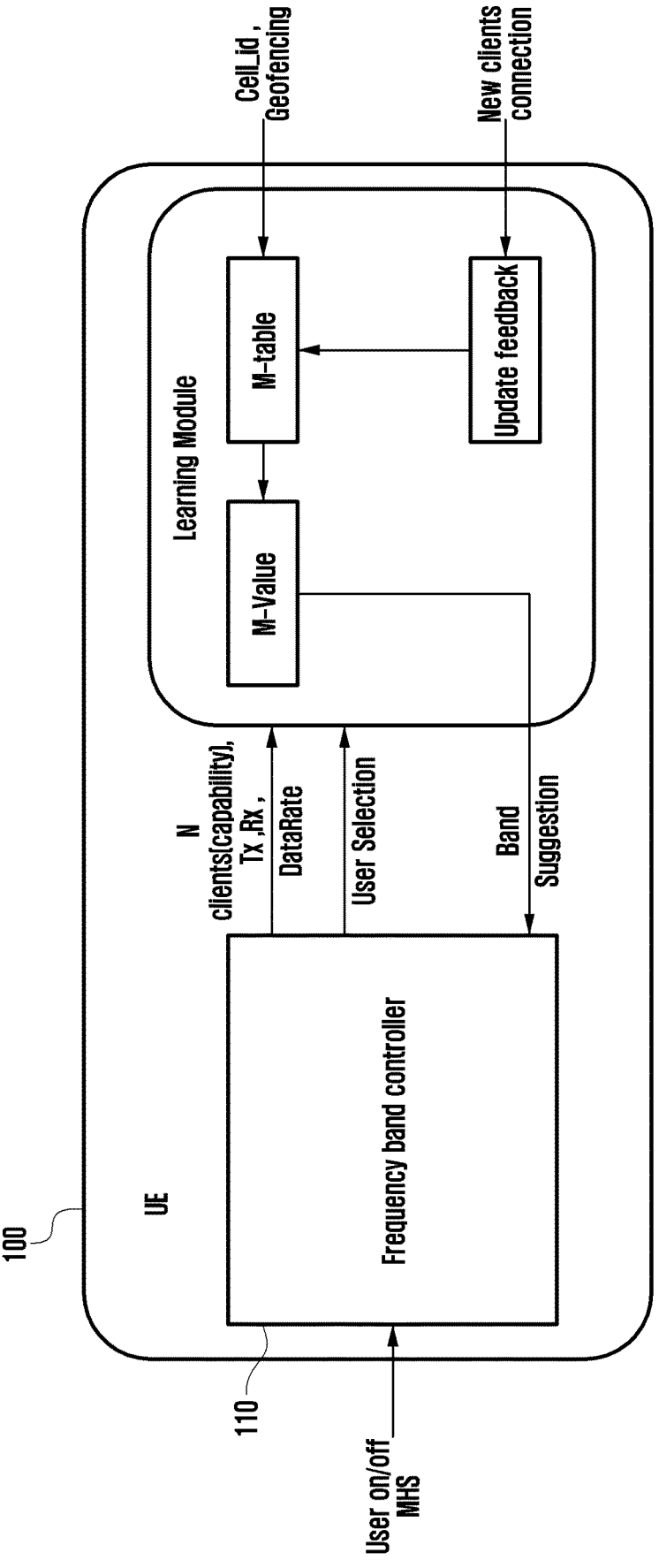
FIG. 9 depicts a process of using a RL based Learning Engine for selecting an operating band for MHS, according to embodiments as disclosed herein.

FIG. 9 depicts a process of using a RL based Learning Engine for selecting an operating band for MHS. The UE can suggest a M value (M-val) for the current context (cell)id/geofencing, previously connected devices capability, data rates, and so on). M-val is a value indicating how much the user intends to use a particular band for MHS. Based on M-Val and considering user preferences, the frequency band controller 110 can decide to turn on the MHS in 2 Ghz/5 GHz/any other band.

FIG. 10 depicts an example process for enabling MHS auto links in Multi Link operations in 802.11be. Consider that software AP (SoftAP) is enabled with a multi-link operation where one or more links are enabled for multi-link operation. The UE can enable/disable a link to the bands (such as, 2.4 GHz, 5 GHz or 6 GHz), when required/not required; i.e., the link to the bands can be disabled when there is no traffic flow and low power links can be used just to maintain connection. This saves power and provides good user experience. In an embodiment herein, the auto band & auto link for the MHS are applied over non-Wi-Fi7 and Wi-Fi7 devices.

Figure 11:
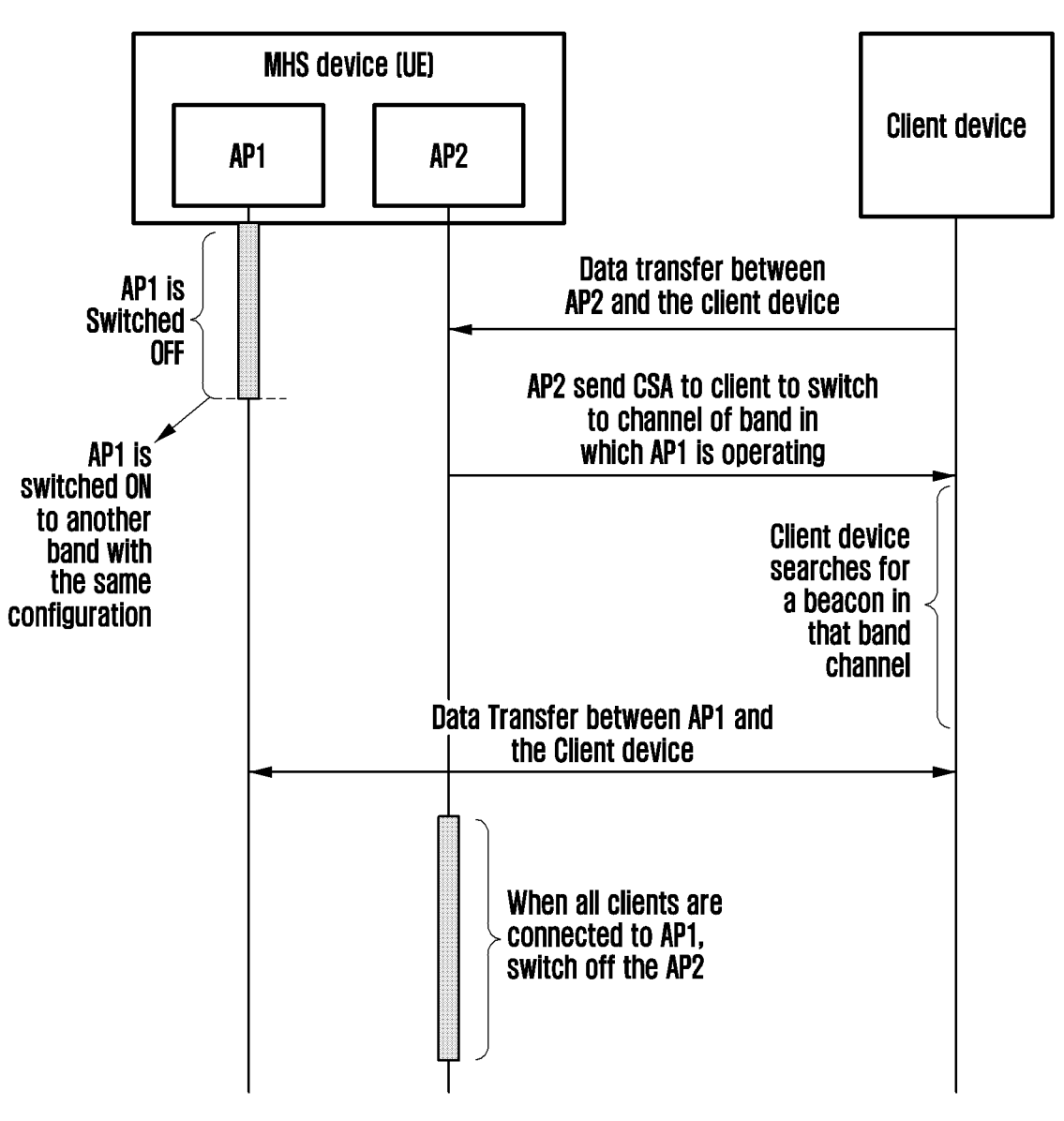
FIG. 11 depicts a process of speeding up the process of performing band switching using a channel switch announcement and AP+AP in MHS, according to embodiments as disclosed herein.

FIG. 11 depicts a process of speeding up the process of performing band switching using a channel switch announcement and AP+AP in MHS. Based on the capability of the connected clients, the UE can make CSA to channels of other bands and then switch to the other band. For example, the client device connected on 5 GHz channel receives CSA for 2.4 GHz channel, and then connects on to that channel without any re-association request, which can take about 5-6 seconds to switch to the other channel, and there is no disconnection or ping loss observed during this process. Assume, for example, that the client devices are connected to AP2 and are operating in Band1 and AP1 is switched off. Consider that AP1 is turned ON and is operating in Band2 with the same configuration as Band1 (i.e., same SSID, password etc.). AP2 sends a CSA to the connected clients to switch to the channel of Band2 (i.e., channel in which AP1 is operating). The client device searches for a beacon or may send a probe request to that particular channel and the client device gets connected to AP1. When all devices get connected to AP1, AP2 is switched off.

FIGS. 12A and 12B depict example UIs, for enabling Auto Band options in MHS. FIG. 12B depicts an example UI, wherein the UE gives notification information that MHS is on/off in a quick panel/lock screen/notification panel. Use of this indication may help a user of the UE and the user will be aware that hot spot is on. The user can directly access the hot spot setting, if required (by clicking on a notification). Along with the quick panel button, embodiments herein can notify the user with switch band option like '2.4 Ghz' and '5 Ghz' etc, so that when the user wants to switch bands, it can be done with just one click on any given option. Providing these options in the notification, the user may be aware about MHS band available options and the user may able to solve above problem.

The foregoing description of the specific embodiments will so fully reveal the general nature of the embodiments herein that others can, by applying current knowledge, may readily modify and/or adapt for various applications such specific embodiments without departing from the general concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the spirit and scope of the embodiments as described herein.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. By way of example, each of the phrases "at least one of A, B, and C" or "at least one of A, B, or C" refers to only A, only B, or only C; any combination of A, B, and C; and/or at least one of each of A, B, and C. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

The invention claimed is:

1. A method for selecting a frequency band of a mobile hot spot (MHS) by a user equipment (UE), the method comprising:

determining, by the UE, whether the UE is functioning as the MHS while connecting with at least one client device;

determining, by the UE, one or more parameters, wherein the one or more parameters comprise at least one of signal strength parameters, connectivity conditions of the UE in relation to the client device, or a data consumption capability of the UE;

mapping, by the UE, one or more parameters of the UE to at least one of a cell identity (ID), an access point ID (AP ID) in case of Wi-Fi sharing, or a geolocation of the UE, while connecting with the client device; and selecting, by the UE, the frequency band to provide MHS connectivity to the client device from a plurality of frequency bands based on at least one of the mapped cell ID, the AP ID or the geolocation of the UE.

2. The method of claim 1, wherein the connectivity conditions of the UE comprise information on traffic requirements, an upstream connection, packet error rates, power requirement, or a throughput of the UE in relation with the at least one client device.

3. The method of claim 1, further comprising adding, by the UE, a Wi-Fi band selection option in a user interface of the UE.

4. The method of claim 1, further comprising shifting, by the UE, an optimum frequency band between one or more frequency bands, if the UE supports a dual-band or a tri-band.

5. The method of claim 1, further comprising selecting, by the UE, at least one link from a multi-link operation of the MHS.

6. The method of claim 1, further comprising assigning, by the UE, predefined values to the plurality of the frequency bands.

7. The method of claim 6, further comprising calculating, by the UE, a probability score of the plurality of the frequency bands being selected by the UE.

8. The method of claim 1, further comprising maintaining, by the UE, an active connection and turning off an idle connection such that the idle connection is enabled only during band switch.

9. A user equipment (UE), comprising:

memory, comprising one or more storage media, storing instructions; and at least one processor coupled to the memory, wherein the instructions, when executed by the at least one processor individually or collectively, cause the UE to:

determine whether the UE is functioning as a mobile area hot spot (MHS) while connecting with at least one client device;

determine one or more parameters, wherein the one or more parameters comprise at least one of: signal strength parameters, connectivity conditions of the UE in relation to the client device, or a data consumption capability of the UE;

map one or more parameters of the UE to at least one of a cell identity (ID), an access point ID (AP ID) for Wi-Fi sharing, or a geolocation of the UE, while connecting with the at least one client device to the cell ID or the geolocation of the UE; and select a frequency band to provide MHS connectivity to the client device from a plurality of frequency bands based on at least one of the mapped cell ID, the AP ID, or the geolocation of the UE.

10. The UE of claim 9, wherein the connectivity conditions of the UE comprise an information on traffic requirements, an upstream connection, Packet Error rates, power requirement, and a throughput of the UE in relation with the at least one client device.

11. The UE of claim 9, wherein the instructions, when executed by the at least one processor individually or collectively, further cause the UE to add a Wi-Fi band selection option in a user interface of the UE.

12. The UE of claim 9, wherein the instructions, when executed by the at least one processor individually or collectively, further cause the UE to shift an optimum frequency band between one or more frequency bands, if the UE supports a dual-band or a tri-band.

13. The UE of claim 9, wherein the instructions, when executed by the at least one processor individually or collectively, further cause the UE to select at least one link from a multi-link operation of the MHS.

14. The UE of claim 9, wherein the instructions, when executed by the at least one processor individually or collectively, further cause the UE to assign predefined values to the plurality of the frequency bands.

15. The UE of claim 14, wherein the instructions, when executed by the at least one processor individually or collectively, further cause the UE to calculate a probability score of the plurality of the frequency bands being selected by the UE.

16. The UE of claim 9, wherein the instructions, when executed by the at least one processor individually or collectively, further cause the UE to maintain an active connection and turn off an idle connection such that the idle connection is enabled only during band switch.

17. A method for selecting a frequency band in a mobile hot spot (MHS) in a user equipment (UE), the method comprising:

detecting, by the UE, that the UE is in an MHS mode operating in a first frequency band and connected to at least one client device;

determining, by the UE, an available frequency band capability of the at least one client device;

determining, by the UE, one or more signal strength parameters of the UE in relation to the at least one client device;

determining, by the UE, connectivity conditions of the UE in relation to the at least one client device; and selecting, by the UE, an optimum frequency band other than the first frequency band to provide MHS connectivity to the client device based on at least one of the determined frequency band capability of the at least one client device, the signal strength parameters, or connectivity conditions of the UE in relation to the at least one client device.

18. The method of claim 17, wherein the connectivity conditions comprise a signal strength of the one or more MHS available for the UE to select.

19. The method of claim 18, comprising:

selecting, by the UE, a band, on a user initiating a connection to the MHS;

identifying, by the UE, band capability of at least one connected device to the MHS;

identifying, by the UE, user band preferences for the MHS; and automatically selecting, by the UE, a frequency band for operation of the MHS based on at least one predefined condition, at least one identified capability, or at least one user preference, wherein predefined conditions are upstream connection, packet error rates, power consumption, and throughput.

* * * * *